Patented Jan. 14, 1941

2,228,596

UNITED STATES PATENT OFFICE 2,228,596

PREPARATION OF CHOLANIC AND KETO-CHOLANIC ACIDS

Russel J. Fosbinder, Bernardsville, N. J., assignor to The Maltbie Chemical Company, Newark, N. J., a corporation of New Jersey No Drawing. Application December 6, 1939, Serial No. 307,773

22 Claims. (Cl. 260—397)

This invention relates to the preparation of cholanic and ketocholanic acids such as cholic acid and dehydrocholic acid, also known as trihydroxycholanic acid and triketocholanic acid, respectively. Gall, as it is available in the natural state, is a complex mixture of various compounds including the various gall pigments such as biliverdine and bilirubine as well as several gall acids. Saponification of gall and precipitation of the gall acids therefrom has been employed heretofore as a means of isolating the gall acids and preparing oxidation products thereof but considerable difficulty has been experienced in obtaining high yields of either the pure cholic acid or its oxidation product, dehydrocholic acid. The latter compound is especially valuable in the treatment of numerous biliary tract disturbances.

In the preparation of pure cholic acid from such a natural material as ox gall, two main problems are involved; first, the efficient separation of the mixture of gall acids from gall pigments such as biliverdine and bilirubine and from the fatty acids precipitated by acid from the saponified gall, and, second, the isolation of trihydroxycholanic acid from the dihydroxycholanic, monohydroxycholanic and other gall acids mixed with it. Heretofore, this has been accomplished only by tedious and expensive processes involving either the formation of the soluble but highly toxic barium salt or two or more recrystallizations of a highly refined gall acid mixture using large quantities of anhydrous ethanol, a very expensive procedure.

It is an object of my invention to prepare from gall or the saponification products of gall a refined mixture of hydroxycholanic acids by a simple, relatively inexpensive procedure.

A further object of the invention is to prepare such a refined mixture of hydroxycholanic acids by treatment of a mass precipitated by an acid from saponified gall with a suitable solvent and an amine.

Another object is the preparation of dehydrocholic acid by oxidizing a mixture of hydroxycholanic acids and separating by a simple and economic procedure pure dehydrocholic acid from the reaction product.

I have discovered that a highly refined mixture of gall acids may be prepared simply by treating a mass precipitated with an acid from the saponification products of gall with an aqueous solution of an amine and a suitable water immiscible organic solvent for the gall pigment matter and the fatty components of the mass. This treatment effects a separation of the mixture of the hydroxycholanic acids from the bile pigments and from the fatty acids precipitated by the addition of acid to the saponified gall. The gall acid mixture thus obtained dries almost white in color and the trihydroxycholanic, or cholic acid, may then be separated in a pure state simply by recrystallization with a suitable solvent such as methanol. While other solvents can be used for the recrystallization, I have discovered that methanol is particularly effective, inasmuch as the cholic acid crystallizes in a pure form without any alcohol of crystallization as happens when ethanol is used.

Various water soluble amines may be used in accordance with my invention, although I prefer to employ a water soluble alkanolamine or alkyldiamine which has a relatively low vapor pressure. Monoethanolamine has been found to produce excellent results, although diethanol- and triethanolamines as well as ethylene diamine may be employed. Diethanolamine and triethanolamine should be used in substantially larger quantities, however, as compared with the primary amines.

Other organic solvents that are substantially immiscible with water, such as benzene, cyclohexane, or petroleum ether may also be utilized in place of the toluene. The suspension formed by the precipitated mass in the mixture of toluene and amine solution is allowed to settle and the toluene layer poured off. The toluene takes up most of the pigment matter and fatty products which are thus separated, and the suspension remaining may be filtered to obtain a pale yellow solid residue which may be suitably washed with lukewarm water and dried at a moderate temperature. Vacuum drying may be employed, if desired, in order to speed up the process, and the temperature of drying is preferably quite low at first, although it may be raised as the mass becomes drier.

For example, the material may be dried for one day at 37° C. and then further dried for from one to 24 hours at any suitable temperature up to about 75° C.

The dried mass is almost white and comprises a mixture of gall acids which may be separated by extraction with boiling methanol to produce directly a pure crystalline cholic acid having a melting point of 197–198° C. After the first extraction with methanol the crystalline material is almost white in color and has a melting point of 186 to 194° C. A 50 to 60% yield of pure cholic acid may be obtained by two extractions with methanol, the percentage yield being based on the theoretical quantity that should be obtained from the original unsaponified ox gall. Other solvents having a selective dissolving action may of course be used for crystallizing cholic acid from the mixture of gall acids, as is well understood in the art.

I have also discovered that instead of isolating cholic acid and oxidizing it to dehydrocholic acid, the mixture of separated gall acids or impure cholic acid may be oxidized and the pure dehydrocholic acid readily separated from the oxidation product by treatment with isopropanol. This permits the use of much higher concentrations of oxidizing agent and gall acids in acetic acid than is possible when oxidizing a purified cholic acid. Thus, smaller quantities of acetic acid are required, and the purification of cholic acid is not required in preparing dehydrocholic acid according to this embodiment of my invention.

The invention is not limited to the oxidation of a mixture of gall acids in an acetic acid medium, however, because substantial savings may be effected even when the mixture is oxidized in other mediums.

In order to separate pure dehydrocholic acid from the oxidized mixture of gall acids, I prefer to employ isopropanol containing about 1 to 10% water. Anhydrous isopropanol or isopropanol containing up to 20% of water may be used. This operates to produce a separation of the various ketocholanic acids by reason of their difference in solubility in this solvent and without formation of objectionable esters such as occurs with the lower alcohols. Isopropanol-water with about 10% water used in about 3 to 3½ parts by volume to 1 part by weight of dried solid material is capable of separating pure dehydrocholic acid having a melting point of 235–237° C. in a single extraction.

In order to illustrate the invention, the following specific examples of the preparation of cholic and dehydrocholic acids are given, although it is to be understood that the invention is not limited to the exact procedure, reagents or proportions of reagents given in these examples.

Preparation of cholic acid: 1,000 gms. of powdered ox gall (desiccated ox bile), contained in a suitable flask, are intimately mixed with 1,500 cc. of an aqueous solution containing 160 grams of sodium hydroxide. The mixture is then refluxed for 20 hours, cooled, diluted with an equal volume of water and the saponification product is acidified with about 3 liters of 10% hydrochloric acid. The precipitated spongy mass is then washed and is kneaded twice with water (1400 cc.) to remove as much excess acid as possible. After standing for a short time in the open air, the mass becomes hard and brittle. Small pieces of the resinous mass are then slowly added to a rapidly stirred mixture (heated to temperature of 50–65° C.) of the following composition:

Water _____ cc__ 1,000
Monoethanolamine _____ gms__ about 24
Toluene _____ cc__ 1,000

The brittle mass rapidly disintegrates and a dispersed suspension results. After the entire mass has been added, stirring is continued for 15 to 30 minutes, and the mixture is then allowed to stand. The toluene layer is then decanted off and the remaining aqueous suspension is filtered. The pale yellow residue is washed twice with 500 cc. of warm water and dried at a moderate temperature. After drying, the precipitated mixture of gall acids thus obtained is almost white in color.

The mixture of the gall acids, having a melting point of approximately 155–157° C. and weighing approximately 475–550 grams may then be treated with boiling methanol, one part by volume for one part by weight of solid, in order to separate the cholic acid therefrom. After cooling to a temperature not substantially below 20° C., the excess solvent is removed by filtration and the residue washed with about one-fourth of the initial volume of methanol. The crystalline residue, almost white in color and having a melting point of 186–194° C. is then treated with about 250 cc. of methanol, heated to boiling, and allowed to cool to a temperature not substantially below 20° C. The white crystalline precipitate is filtered off by suction and washed with about 100 cc. of methanol. This final residue is then dried at a temperature of 35–45° and consists of white crystals of pure cholic acid melting at 197–198° C. A 50–60% yield of pure cholic acid is obtained in this manner.

Preparation of dehydrocholic acid: 600 gms. of a mixture of hydroxycholanic acids obtained as hereinbefore described, or by any other suitable procedure, are added to 1500 cc. of glacial acetic acid. After heating to 30° C. and with continuous stirring, a mixture consisting of 400 grams chromium trioxide, 400 cc. of water, and 500 cc. glacial acetic acid, is gradually added over a period of 2 to 3 hours, maintaining the temperature between 30–40° C. After the addition of oxidizing agent is complete, stirring is continued for about ½ hour. About 70 cc. of 38% sodium bisulfite solution are then added and the solution diluted with water to a volume of 12 liters. The precipitate obtained by dilution is then washed with water and finally dissolved in a sufficient quantity of 15% sodium hydroxide solution. The residual chromium compounds are removed by filtration and the solution precipitated with 10% sulfuric acid, heated to 80–100° C., filtered and washed. After drying at a moderate temperature, a pale yellow mixture of oxidation products melting at 204–212° C. is obtained.

This material is then treated with isopropanol (preferably 3 to 3½ parts by volume of isopropanol to 1 part by weight of solid material) and heated to boiling. The isopropanol employed in this operation may contain from 1 to 20% of water by volume. The mixture is allowed to cool to a temperature not substantially below 20° C., filtered and washed with about ⅙ the amount of solvent originally employed. The residue obtained, a 50–60% yield, is then dried at a moderate temperature and consists of white, pure dehydrocholic acid, M. P. 235–237° C.

I believe that the separation and purification of the hydroxycholanic acids from the fatty acids and bile pigments is made possible by the formation of amine soaps and amine bile pigment salts that are soluble in water and in the organic solvent employed, thus making possible a rapid and complete separation by reason of substantially different solubility characteristics of the amine products. Whatever the exact mechanism of the process may be however, the yield and purity of the product have been definitely established.

If pure cholic acid is being isolated from this gall acid mixture with a solvent such as methanol, I prefer to avoid the cooling of the suspension to a temperature lower than 15° C. If lower temperatures are employed, appreciable quantities of deoxycholic acid and other gall acids are precipitated with the result that an impure product having a lower melting point than pure cholic acid is obtained.

If diethanolamine or triethanolamine are used in place of the monoethanolamine given in the specific example above, approximately two to three times the amounts of monoethanolamine is required. When ethylenediamine is substituted for the monoethanolamine in the specific example, a suitable gall acid mixture is obtained, although the yield of pure cholic acid obtained is somewhat lower.

Instead of treating the mixture of gall acids resulting from the amine refining treatment to separate pure cholic acid, this mixture of gall acids or a similar mixture derived by a conventional method may be oxidized directly to obtain the corresponding ketocholanic acids from which dehydrocholic acid may be separated. This mixture of gall acids may be oxidized directly by treatment with a suitable oxidizing agent such as chromium trioxide in an acetic acid medium, or other oxidizing agents and mediums may be used. For example, the cholic acid in a relatively pure form or a refined mixture of hydroxycholanic acids may be oxidized directly by simply suspending this material in 20% sulfuric acid and adding thereto an aqueous solution of a dichromate, such as sodium dichromate. The dichromate solution is preferably added slowly with stirring, and the temperature should be maintained at about 30° to about 75° C., depending upon the purity of the cholic acid being oxidized. With a relatively pure cholic acid, a temperature of 30–40° C. should be sufficient, while with a refined mixture of hydroxycholanic acids a temperature of 65–75° C. will probably be needed to produce the green color indicative of the oxidation reaction. A yield of about 90% of dehydrocholic acid may be obtained by this oxidation procedure starting with pure cholic acid.

When cholic acid or a mixture of hydroxycholanic acids are oxidized with chromium trioxide, it is necessary to separate the chromic acid from the oxidized product. The addition of a salt such as sodium bisulfite to the oxidized product makes it possible to separate a large portion of the oxidizing agent, and extraction of the solids with a suitable alkali such as caustic soda or sodium carbonate removes the balance.

After oxidation of the gall acid mixture to a mixture of the ketocholanic acids is completed, the oxidation product may be treated by extraction with isopropanol to separate the dehydrocholic acid. The isopropanol preferably contains 1 to 10 parts of water by volume, and the extraction product dried at a moderate temperature consists of white, pure dehydrocholic acid having a melting point of 235–237° C. If the isopropanol is anhydrous or contains only a very small proportion of water, a good separation is obtained but larger quantities of solvent are needed. If the water content exceeds about 20%, on the other hand, a poor separation is obtained. The constant boiling mixture of 90% isopropanol and 10% water is especially suitable. Other solvents that have a selective action on the ketocholanic acids and do not form objectionable esters may, however, be employed for this treatment.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A method of preparing cholic acid comprising treating the solids precipitated by acid from a solution of saponified gall with a mixture of an aqueous solution of an amine having a low vapor pressure and a solvent for gall pigment matter that is substantially immiscible with water, separating the gall acids remaining suspended in the aqueous amine layer, and recrystallizing the gall acids with a solvent to separate cholic acid therefrom.

2. A method of preparing dehydrocholic acid comprising treating the solids precipitated by acid from a solution of saponified gall with a mixture of an aqueous solution of an amine having a low vapor pressure and a solvent for gall pigment matter that is substantially immiscible with water, separating the gall acids remaining suspended in the aqueous amine layer, oxidizing said gall acids to form a mixture of ketocholanic acids, and separating dehydrocholic acid from said mixture.

3. A method of preparing dehydrocholic acid comprising oxidizing a mixture of hydroxycholanic acids to produce a mixture of ketocholanic acids, treating said oxidized mixture with isopropanol containing up to about 20% water to dissolve mono- and diketocholanic acids, and filtering the solution to separate dehydrocholic acids therefrom.

4. A method of preparing dehydrocholic acid comprising oxidizing a mixture of hydroxycholanic acids with chromium trioxide to produce a mixture of ketocholanic acids and treating said oxdized mixture with isopropanol containing about 10% of water to separate dehydrocholic acid therefrom.

5. A method of preparing dehydrocholic acid comprising oxidizing a mixture of hydroxycholanic acids with chromium trioxide to produce a mixture of ketocholanic acids, and treating said oxidized mixture with isopropanol contaning up to about 20% water to separate dehydrocholic acid therefrom.

6. A method of separating hydroxycholanic acids from gall comprising treating an acid precipitated mass obtained from gall saponification products with a mixture of a substantially water immiscible gall pigment matter solvent and an aqueous solution of an amine having a low vapor pressure, separating the solvent layer from the aqueous layer, and removing the hydroxycholanic acids suspended in the aqueous layer.

7. A method of separating hydroxycholanic acids from gall comprising treating an acid precipitated mass obtained from gall saponification products with a mixture of a substantially water immiscible gall pigment matter solvent and an aqueous solution of an alkanolamine, separating the solvent layer from the aqueous layer, and removing the hydroxycholanic acids suspended in the aqueous layer.

8. A method of separating hydroxycholanic acids from gall comprising treating an acid precipitated mass obtained from gall saponification products with a mixture of a substantially water-immiscible gall pigment matter solvent and an aqueous solution of an alkyldiamine, separating the solvent layer from the aqueous layer, and removing the hydroxycholanic acids suspended in the aqueous layer.

9. A method of separating hydroxycholanic acids from gall comprising treating an acid precipitated mass obtained from gall saponification products with a mixture of toluene and an aqueous solution of an alkanolamine, and removing the hydroxycholanic acids remaining suspended in the aqueous layer.

10. A method of separating hydroxycholanic acids from gall comprising treating an acid precipitated mass obtained from gall saponification products with a mixture of toluene and an aqueous solution of an alkyldiamine, and removing the hydroxycholanic acids remaining suspended in the aqueous layer.

11. A method of separating hydroxycholanic acids from gall comprising treating an acid precipitated mass obtained from gall saponification products with a mixture of a substantially water immiscible gall pigment matter solvent and an aqueous solution of mono-ethanolamine, and removing the solids remaining suspended in the aqueous layer.

12. A method of separating hydroxycholanic acids from gall comprising treating an acid precipitated mass obtained from gall saponification products with a mixture of a substantially water immiscible gall pigment matter solvent and an aqueous solution of diethanolamine, and removing the solids remaining suspended in the aqueous layer.

13. A method of separating hydroxycholanic acids from gall comprising treating an acid precipitated mass obtained from gall saponification products with a mixture of a substantially water immiscible gall pigment matter solvent and an aqueous solution of ethylenediamine, and removing the solids remaining suspended in the aqueous layer.

14. A method of separating cholic acid from gall comprising treating an acid precipitated mass obtained from gall saponification products with a mixture of a substantially water immiscible gall pigment matter solvent and an aqueous solution of an alkanolamine, separating the solvent layer from the aqueous layer, removing the hydroxycholanic acids suspended in the aqueous layer, and recrystallizing the gall acids with a solvent to separate cholic acid therefrom.

15. A method of preparing dehydrocholic acid from gall comprising treating an acid precipitated mass obtained from gall saponification products with a mixture of a substantially water immiscible gall pigment matter solvent and an aqueous solution of an alkanolamine, removing the suspended solids from the aqueous layer, oxidizing said solids with chrominum trioxide, and treating the oxidized product with a selective solvent to separate dehydrocholic acid therefrom.

16. A method of separating cholic acid from gall comprising treating an acid precipitated mass obtained from gall saponification products with a mixture of toluene and an aqueous solution of an alkanolamine, removing the suspended solids from the aqueous layer, and recrystallizing the gall acids thus obtained with methanol to separate cholic acid therefrom.

17. A method of preparing dehydrocholic acid from gall comprising treating an acid precipitated mass obtained from gall saponification products with a mixture of toluene and an aqueous solution of an alkanolamine, removing the suspended solids from the aqueous layer, oxidizing said solids to produce a mixture of ketocholanic acids, and treating the oxidized product with isopropanol containing up to about 20% water to separate dehydrocholic acid therefrom.

18. A method of separating cholic acid from gall comprising treating an acid precipitated mass obtained from gall saponification products with a mixture of toluene and an aqueous solution of monoethanolamine, removing the suspended solids from the aqueous layer, and recrystallizing the gall acids thus obtained with a solvent to separate cholic acid therefrom.

19. A method of preparing dehydrocholic acid from gall comprising treating an acid precipitated mass obtained from gall saponification products with a mixture of toluene and an aqueous solution of monoethanolamine, removing the gall acids suspended in the aqueous layer, oxidizing said gall acids with chrominum trioxide in an acetic acid medium, and treating the oxidized product with isopropanol containing about 1 to 10% water to separate dehydrocholic acid therefrom.

20. A method of separating hydroxycholanic acids from gall comprising saponifying said gall, adding an acid thereto to precipitate a spongy mass, kneading said mass with water, treating said mass with a mixture of an organic pigment and fat solvent substantially immiscible with water and an aqueous solution of an amine selected from the group consisting of alkanolamines and alkyldiamines, separating the solvent and aqueous layers thus obtained, and removing the hydroxycholanic acids suspended in the aqueous layer.

21. A method of separating cholic acid from gall comprising separating the hydroxycholanic acids from an acid mass derived from saponified gall, and crystallizing cholic acid by treatment of said hydroxycholanic acids with methanol.

22. A method of separating cholic acid from gall comprising separating the hydroxycholanic acids from an acid mass derived from saponified gall by treating said mass with a mixture of an aqueous solution of an amine selected from the class consisting of alkanolamines and alkyldiamines and a substantially water immiscible gall pigment and fatty acid solvent, and recrystallizing the gall acids thus obtained with substantially anhydrous methanol to separate cholic acid.

RUSSEL J. FOSBINDER.